INVENTOR.
Kenneth C. Yarborough
BY
Attorneys

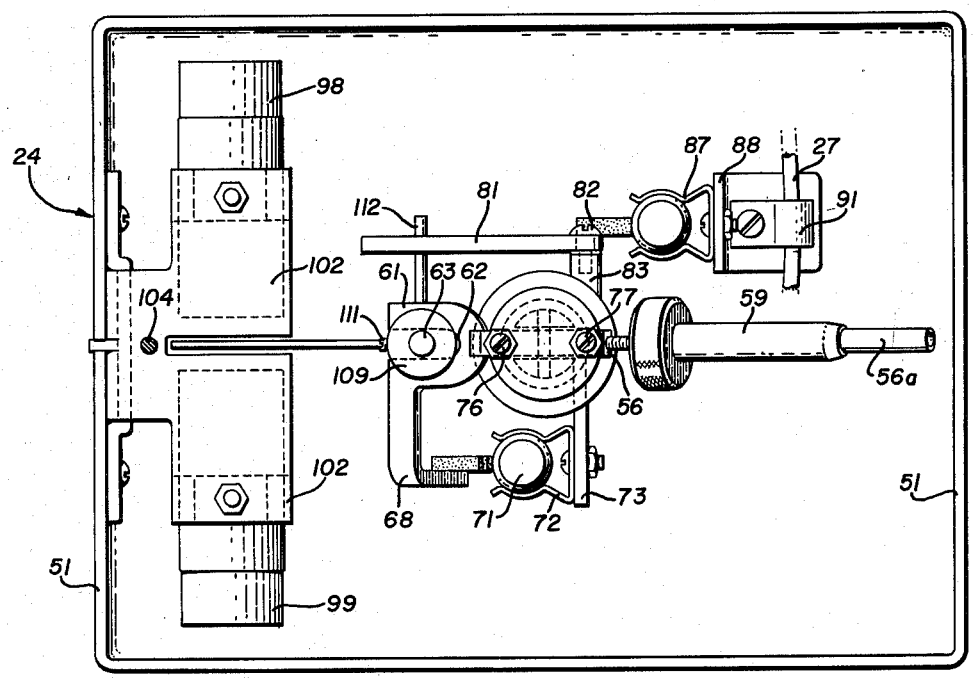
Fig. 3
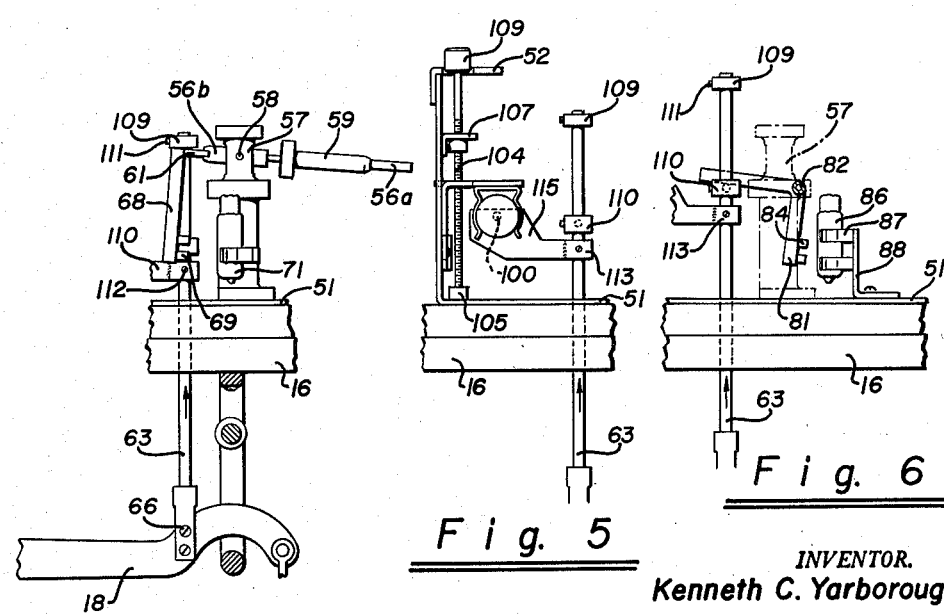
Fig. 4
Fig. 5
Fig. 6
INVENTOR.
Kenneth C. Yarborough
BY
Attorneys

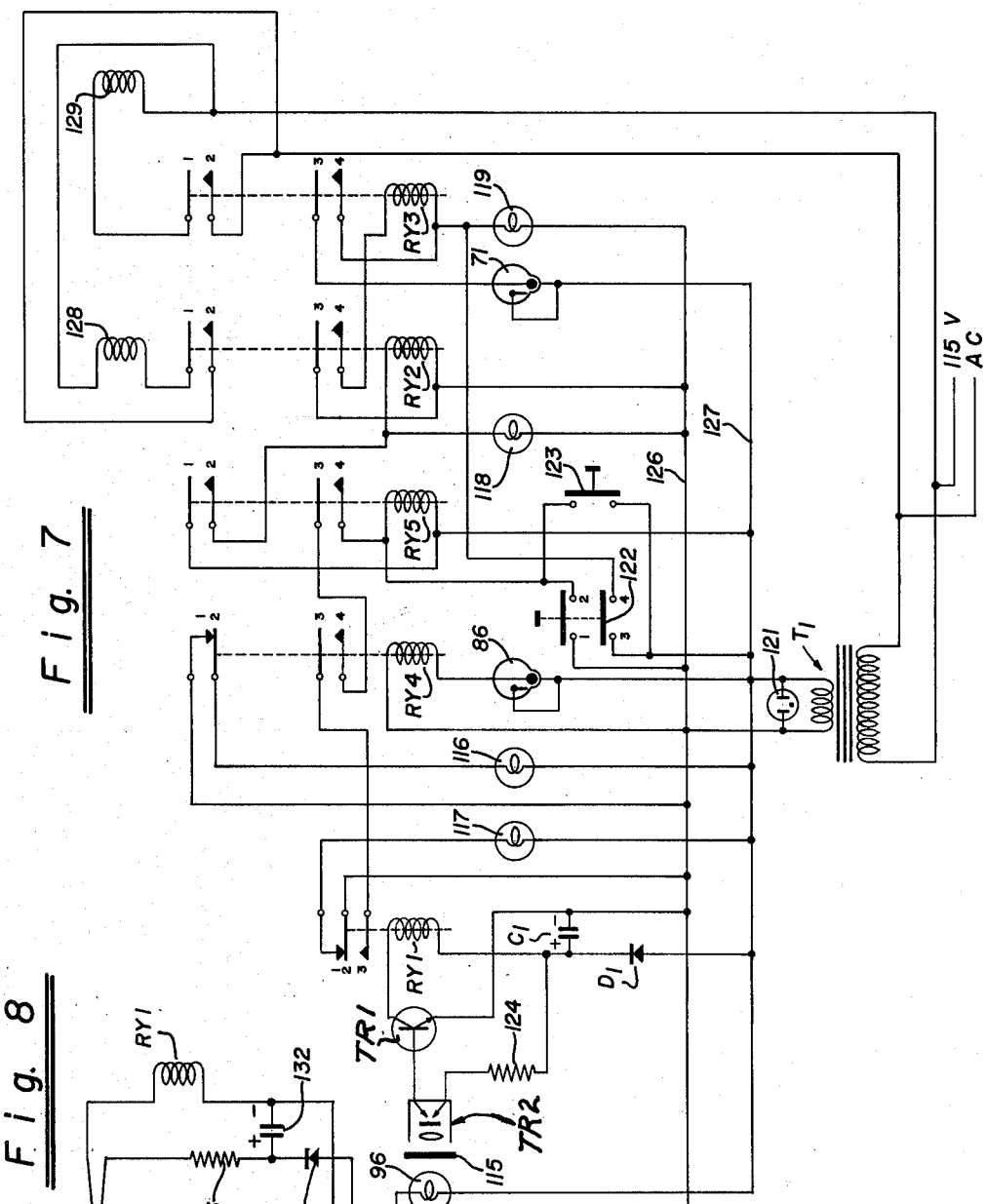

United States Patent Office 3,131,780
Patented May 5, 1964

3,131,780
WEIGHING APPARATUS
Kenneth C. Yarborough, 754 21st St., Richmond, Calif.
Filed Jan. 23, 1961, Ser. No. 84,009
10 Claims. (Cl. 177—46)

This invention relates to a weighing apparatus and more particularly to an automatic weighing apparatus.

Automatic weighing apparatus heretofore provided has not been completely satisfactory because it has not been readily adaptable to different types of scales and also because it was difficult to obtain the required accuracy with such automatic weighing apparatus. There is, therefore, a need for a new and improved automatic weighing apparatus which performs weighing operations with great accuracy.

In general, it is the object of the present invention to provide a weighing apparatus which is automatic in operation and which is able to perform weighing operations with great accuracy.

Another object of the invention is to provide weighing apparatus of the above character which can be utilized on beam type and dial type scales.

Another object of the invention is to provide weighing apparatus of the above character in which no friction is applied to the beam of the scale during the weighing operation.

Another object of the invention is to provide weighing apparatus of the above character in which there is no interference with the normal operation of the scale mechanism during the weighing operation.

Another object of the invention is to provide weighing apparatus of the above character which is particularly adapted for use for bulk and dribble flow.

Another object of the invention is to provide weighing apparatus of the above character which gives an automatic indication when there is an overweigh.

Another object of the invention is to provide weighing apparatus of the above character which can be attached to all types of scales which utilize beams with ease.

Another object of the invention is to provide weighing apparatus of the above character which is relatively simple in construction and which requires very little maintenance.

Another object of the invention is to provide weighing apparatus of the above character in which shut-off is provided at the balance point of the scale beam.

Another object of the invention is to provide weighing apparatus of the above character which can be readily adjusted.

Another object of the invention is to provide weighing apparatus of the above character in which indicating means is provided for indicating balance, dribble, bulk and overbalance conditions.

Another object of the invention is to provide weighing apparatus of the above character in which manually operated means is provided for adding small amounts of material.

Additional objects and features of the invention will appear from the following description in which the preferred embodiments have been set forth in detail in conjunction with the accompanying drawings.

Referring to the drawing:

FIGURE 3 is a cross-sectional view taken along the line 3—3 of FIGURE 2.

FIGURE 4 is an enlarged detailed view of a portion of the weighing apparatus showing the various positions of parts of the apparatus during a weighing operation.

FIGURE 5 is a partial side-elevational view of another portion of the apparatus in the same weighing position as in FIGURE 4.

FIGURE 6 is another partial side-elevational view showing the positions of the portions of the weighing apparatus during an overbalance condition.

FIGURE 7 shows the circuit diagram utilized in my weighing apparatus.

FIGURE 8 shows a portion of a circuit diagram incorporating another embodiment of my invention.

Figure 1:
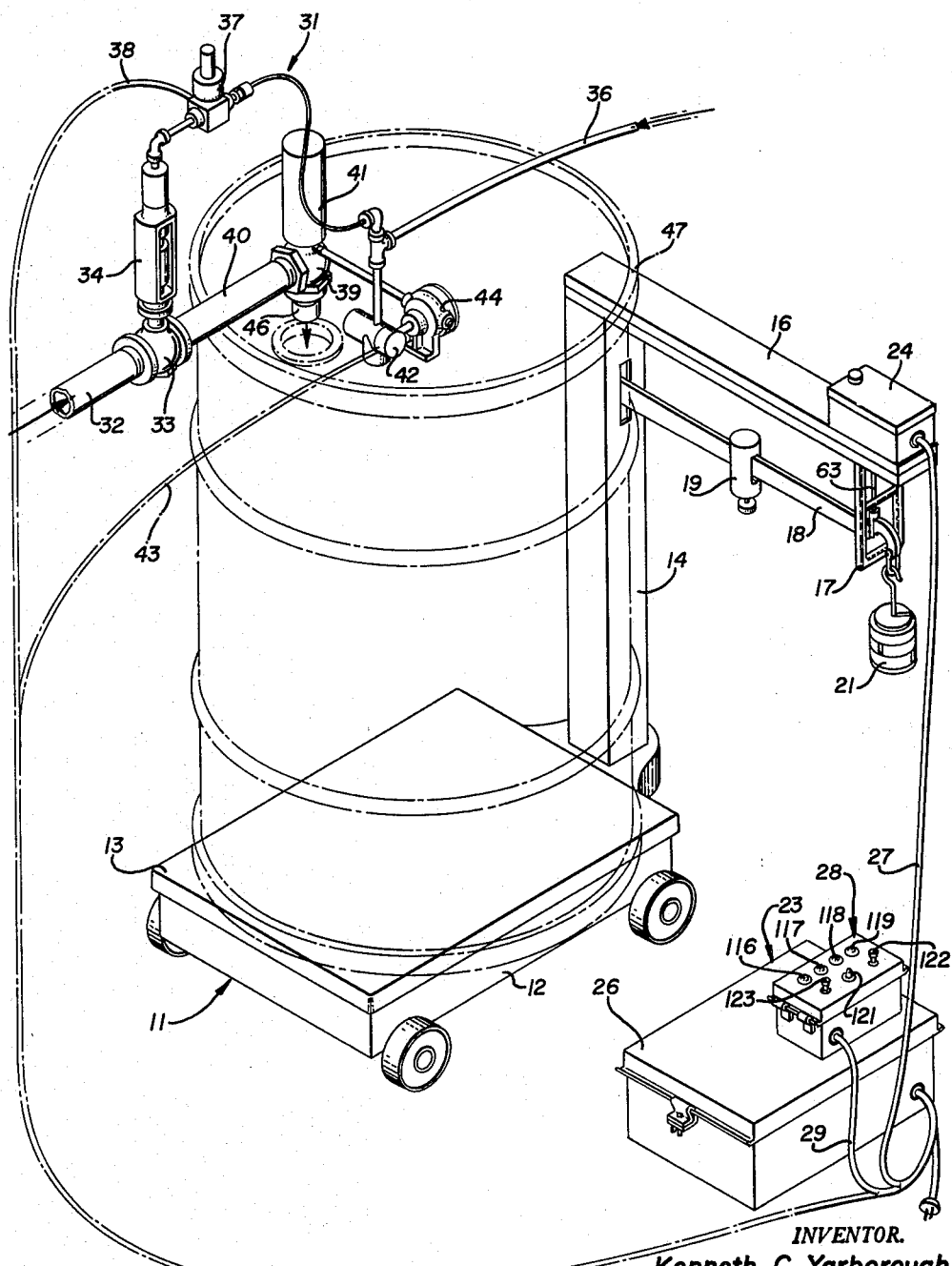
FIGURE 1 is an isometric view of automatic weighing apparatus incorporating my invention.

In general, my invention consists of a scale which includes a weighing beam. An operating arm is connected to the weighing beam and carries means for providing a bulk shut-off, means for providing a dribble shut-off and means for indicating an overbalance condition. The dribble shut-off includes a moving vane connected to the operating arm and which is adapted to control light passage to photosensitive means which operates the dribble shut-off.

More in particular, my weighing apparatus, as shown in the drawings, consists of a scale 11 of the platform type which includes a scale frame 12, a scale platform 13, and a scale column 14 supported upon the scale frame 12. A horizontal support member 16 is secured to the vertical support column 14 and carries a trig loop 17. The scale also includes a scale beam 18 which extends through the trig loop 17 and upon which is slidably mounted a poise 19. Counter-poise weights 21 are detachably mounted on the end of the scale beam 18 as shown in the drawing.

A scale control device 23 is connected to the scale 11 and includes a sensing mechanism 24 which is mounted on the horizontal member 16 of the scale. The sensing mechanism is connected to a circuit box 26 by a cable 27, and the circuit box 26 is connected to a control box 28 by cable 29.

The scale control device 23 is connected to suitable flow control means 31 which, as shown in the drawing, can consist of fluid flow control devices controlling fluid flow from a fluid supply pipe 32. As shown in the drawing, the fluid control device consists of a bulk control valve 33 operated in a suitable manner such as by an air cylinder 34 connected to an air supply line 36 under a suitable pressure such as 100 lbs. per square inch. The air cylinder 34 is connected to the air supply through a solenoid operated valve 37 which is connected to the scale control device 23 by a cable 38.

The flow control devices also include a dribble or final shut-off valve 39 also connected into the main supply pipe 32 through a pipe 40 which is connected to the outlet of the bulk shut-off valve 33. The dribble valve is also controlled by suitable means such as an air cylinder 41 connected to the air supply line 36 through a solenoid operated valve 42 which is connected to the scale control device 23 by a cable 43. A quick air release valve 44 is provided for the air cylinder 41 so that it will be released as soon as the solenoid operated valve is deenergized. The construction and operation of the bulk and dribble valves, the operating cylinders, the three-way solenoid operated valves and the quick air release valve are well known to those skilled in the art, and hence will not be described in detail.

The bulk valve 33 does not completely shut-off the flow of fluid from pipe 32 so there is still a small fluid flow through the dribble valve 39 when the bulk flow valve 33 is shut-off. The outlet passage of dribble valve 39 is connected to an outlet pipe 46 which supplies the fluid discharged through the valves into a suitable container such as the barrel 47 shown in dot and dash lines resting upon the platform 13 of the scale 11.

Figure 2:
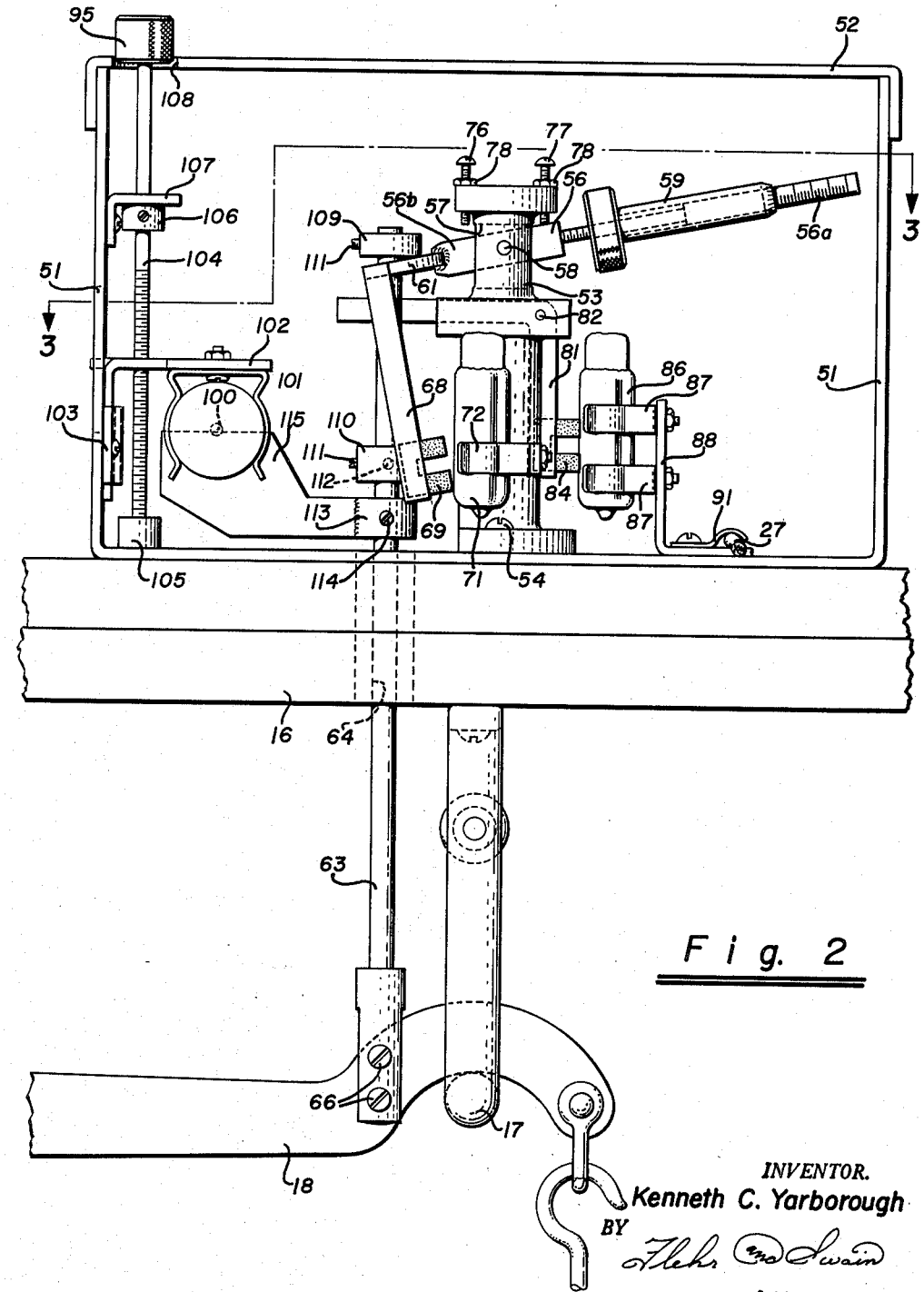
FIGURE 2 is an enlarged view of a portion of the weighing apparatus.

The sensing mechanism 24 is shown in detail in FIGURES 2 and 3 and consists of a box 51 which is provided with a weather-tight cover 52. The box 51 is secured upon the horizontal supporting member in any suitable manner such as by bolts or screws (not shown). A vertical support post 53 is mounted within the box 51 by screws 54. A pre-load lever 56 is pivotally mounted in an elongate slot 57 provided in the upper portion of the support post 53 by a pin 58 extending through the support post perpendicular to the elongate slot 57. One end 56a of the lever 56 is threaded and carries a pre-load weight 59 which is threadably mounted on and is adapted to be adjusted longitudinally of the end 56a of the lever to pre-load the lever arm as hereinafter described.

The other end 56b of the lever 56 has mounted thereon a bifurcated member 61 which is provided with a centrally disposed open-ended slot 62 which accommodates a substantially vertical operating rod 63 as shown in the drawing. The rod 63 extends through a hole 64 provided in the horizontal support member 16 of the scale and is rigidly attached to the scale beam 18 by suitable means such as a pair of screws 66. A bulk valve arm 68 is connected to the bifurcated member 61 and, as shown, may be an integral part of the bifurcated member 61. The bulk arm 68 is generally L-shaped as shown and is adapted to operate switch means. The switch means consists of a magnet 69 carried by the arm 68. The magnet is adapted to engage a Mercoid switch 71 fastened in a clip 72 secured to a horizontal support member 73 mounted on the support post 53.

A pair of adjusting screws 76 and 77 are mounted on the top of the support post and are adapted to engage the lever 56 on opposite sides of the support post. Screw 76 serves as a pre-load stop and screw 77 serves as a stop to prevent the magnet 69 from bumping and breaking the glass enclosure of the Mercoid switch 71. These screws are adapted to be locked in predetermined positions by nuts 78.

An overbalance lever 81, L-shaped in form, is pivotally mounted on a screw 82 threaded into a projection provided on the support post 53. This lever 81 is also adapted to operate switch means which consists of a magnet 84 secured to the lower end of the lever 81. The magnet is adapted to operate a Mercoid switch 86 supported by clips 87 mounted upon a bracket 88 secured to the box 51. A cable clamp 91 is also secured to the bracket 88 and grasps the cable 27.

Photosensitive means is provided for shutting off the dribble valve and consists of a light source in the form of a lamp 96 and a suitable photosensitive element such as a photosensitive transistor 97. The lamp 96 is mounted in a cylindrical lamp housing 98 and the photosensitive element is mounted within a similar cylindrical housing 99. The housings 98 and 99 are provided with centrally disposed apertures 100 in the facing ends. The housings are mounted in clips 101 secured to an L-shaped member 102 and form a part of what may be called a sensing head assembly. The L-shaped member 102 is slidably mounted in a bracket 103 secured to a side wall of the housing of the box 51.

Means is provided for adjusting the vertical position of the sensing head assembly within the box 51 and consists of a vertical adjusting screw 104 threadably engaging the L-shaped member 102. The adjusting screw has its lower end rotatably mounted in a bearing member 105 fixed in the box 51. A collar 106 is fixed to the adjusting screw and underlies a bracket 107 fixed to the side wall of the box. The collar 106 serves to maintain the adjusting screw seated in the bearing 105. The adjusting screw 104 extends up through an opening 108 in the cover 52 and is provided with a knob 95 to facilitate the vertical positioning of the sensing head assembly without removing the cover 52.

A pair of collars 109 and 110 are fixed on the operating rod 63 by screws 111. The collar 109 is adjusted to be engaged by the bifurcated member 61, whereas the collar 110 carries a rod-like extension 112 extending perpendicular to the rod 63 and which is adapted to engage the overbalance lever 81. Another collar 113 is fixed on the rod 63 by a screw 114 and carries a vane 115 which is adapted to control the passage of light from the lamp 96 to the photosensitive element 97. The vane 115 moves in a vertical direction with the operating rod 63.

In the circuit box 26 are mounted a plurality of relays RY1, RY2, RY3, RY4 and RY5. Relay RY1 is a sensitive control relay; relay RY4 is an overload relay; RY5 is a latching relay; RY2 is the dribble relay; and RY3 is the bulk relay. Also mounted within the cabinet 26 is a transformer T1, a diode D1 and a capacitor C1.

Mounted in the cover of the control box 28 is an overbalance light 116, a balance light 117, a dribble light 118, a bulk light 119 and a power light 121. A start push button 122 and an add push button 123 are also mounted in the cover of the control box 28.

The primary of the transformer T1 is connected to a suitable power supply such as 115 volts 60 cycle A.-C. The transformer T1 reduces the voltage to a suitable value such as 6.3 volts A.-C. and applies power to two conductors 126 and 127. The power light 121 is connected across the secondary of the transformer T1 and is lit when power is applied to the transformer. The lamp 96 is also connected to the 6.3 volt supply and is always lit when the transformer T1 is energized. The diode D1 rectifies the A.-C. and supplies D.-C. to transistor TR1 through resistor 124 and transistor TR2 through the winding of relay RY1. Transistor TR1 serves as a photosensitive element, whereas transistor TR2 serves as an amplifier. The capacitor C1 is provided for filtering purposes. The relays are provided with a plurality of contacts which are connected in the manner shown in the circuit diagram. The 115 volts A.C. supply is adapted to be connected through the solenoids of the solenoid operated valves 37 and 42 by the contacts of certain relays as hereinafter described to cause energization of the same.

Operation of my weighing apparatus may now be briefly described in conjunction with the circuit diagram which is shown in FIGURE 7. Let it be assumed that a suitable container such as barrel 47 has been placed on the platform scale and that it is desired to place a predetermined quantity of a certain fluid such as oil in the barrel. The scale control device is properly adjusted to supply this predetermined weight of fluid to the barrel.

When the barrel is empty, the weighing apparatus is in a position so that light from the lamp 96 can pass onto the photosensitive transistor TR1. Conduction occurs in transistor TR1 in the manner well known to those skilled in the art to cause current flow. This current flow is amplified by transistor TR2 to energize the winding of sensitive control relay RY1. Energization of relay RY1 closes its contacts 2 and 3.

The transistors TR1 and TR2 are chosen to obtain a complementary circuit such as n-p-n to p-n-p amplifier which works in a manner well known to those skilled in the art. The transistor circuit is operated from the six volt D.-C. supply provided by the diode D1. It is desirable to use such a low voltage in the circuitry in order to minimize the possibility of any sparking because the weighing apparatus is of a type which can be used in and around hazardous atmospheres.

Now let it be assumed that it is desired to fill the barrel 47 with fluid. Push button 122 is operated. Closing of contacts 1 and 2 of the push button causes energization of the winding of relay RY5 which causes closing of its two sets of normally open contacts. Closing of its contacts 3 and 4 establishes a holding circuit for relay RY5. This holding circuit is completed from line 127 through the winding of the latching relay RY5 through its contacts 3 and 4, through contacts 3 and 4 of relay RY4, and through contacts 2 and 3 of relay RY1 to conductor 126. As explained previously, relay RY1 is in an energized condition because light is passing onto the photosensitive transistor TR1. Relay RY4 is energized because the overload Mercoid switch 86 is closed to energize the winding for relay RY4.

Closing of contacts 1 and 2 of relay RY5 causes energization of the winding of dribble relay RY2. Energization of relay RY2 closes both sets of its normally open contacts. Closing of contacts 3 and 4 of relay RY2 causes energization of the winding of the bulk relay RY3 through contacts 3 and 4 of the start push button 122. This circuit is completed from conductor 127 through contacts 3 and 4 of switch 122, through the winding of the bulk relay RY3, through contacts 3 and 4 of relay RY2 to conductor 126.

Closing of contacts 1 and 2 of relay RY2 energizes the dribble valve solenoid 128 to cause operation of the solenoid-operated valve 42 to permit air to flow to the air cylinder 41 to open the dribble valve 39. Dribble light 118 is energized at the time the relay RY2 is energized.

Energization of bulk relay RY3 closes both of its normally open sets of contacts. Closing of its contacts 1 and 2 energizes the bulk valve solenoid 129 and causes operation of the solenoid-operated valve 37 to permit air to flow to the air cylinder 34 to open the bulk valve 33. Closing of contacts 3 and 4 of relay RY3 establishes a holding circuit for relay RY3 from the line 127 through the bulk Mercoid switch 71 through the contacts 3 and 4 of relay RY3, through the winding of relay RY3, through contacts 3 and 4 of relay RY2 to line 126.

Thus, from the foregoing, it can be seen that as soon as the start push button 122 is operated, both of the dribble and bulk valves are operated to permit fluid flow into the drum 47. As the weight of the liquid in the drum 47 increases and begins to reach the balance point of the scale, the outer end of the beam 18 will be gradually lifted to raise the operating rod 63. As the operating rod 63 is raised, the collars 109 and 110 mounted thereon are also raised. As the collar 109 raises, the preload lever 56 continues to follow the collar 109 and actually applies a predetermined amount force upwardly on the collar 109 to assist the raising of the beam. Thus, in effect, the lever arm 56 is placing a predetermined amount of pre-load on the beam as determined by the position of the pre-load weight 59 on the threaded portion 56a of the pre-load lever arm 56. This pre-loading is applied to the scale beam until the pre-load lever comes into engagement with the stop provided by the screw 76 mounted in the support post 53.

As the lever arm 56 follows collar 109, the magnet 69 carried by the bulk lever arm 68 fixed to the bifurcated member 61 carried by the lever 56 is moved away from the bulk Mercoid switch 71 and at a predetermined position opens the bulk Mercoid switch 71 (see FIGURE 4) to open the holding circuit for the winding of relay RY3 to thereby deenergize the relay. Deenergization of relay RY3 deenergizes the bulk valve solenoid 129 to terminate the major portion of the flow through the bulk valve. Filling of the barrel or drum 47, however, continues through the dribble valve 39 because the bulk valve does not completely shut off the flow. Filling continues until the vane 115 actually rises sufficiently to cut off the light passing from the lamp 96 into the photosensitive element 97, or in other words, the transistor TR1 (see FIGURE 5). Cutting off the light to the transistor TR1 and thereby conduction in the transistor causes deenergization of the relay RY1. Deenergization of relay RY1 opens its contacts 2 and 3 to open the holding circuit for relay RY5. Closing of contacts 1 and 2 of relay RY1 completes the circuit for the balance light 117. Deenergization of the relay RY5 opens the holding circuit for relay RY2 and thereby causes deenergization of the dribble valve 128 to terminate all flow of fluid into the barrel 47. At this point, a predetermined weight of fluid has been placed in the barrel 47.

At the time the dribble solenoid-operated valve 42 is operated, the quick release valve 44 is also actuated to release the air from cylinder 41 so that at the time the dribble solenoid-operated valve 42 is operated, the flow through the dribble valve 39 is terminated immediately to make it possible to obtain accurate measurement of the fluid into the barrel 47.

After the barrel 47 has been filled, another barrel can be placed on the platform scale and filled in the same manner merely by pressing the start push button 122. It is, therefore, apparent that I have provided weighing apparatus by which containers can be filled automatically merely by pressing a start button.

The apparatus can be readily adjusted for the desired weight of liquid to be placed in the barrel 47. This weight is determined by the position of the counter-poise 21 and the poise 19 on the scale beam. The exact balance point of the beam can be used for determining the position of the vane 115 on the operating arm 63 and the position of the sensing head assembly with respect to the vane. A fine adjustment is provided by means of the screw 106 operated by the knob 112. The screw 106 is positioned so that the light is cut off from the photosensitive element at the time the scale reaches a balance point.

The period of time which is utilized for filling the container from only the dribble valve is determined by the position of the weight 59 on the pre-load lever 56. If the weight is shifted to the left as viewed in FIGURE 2, the time when the dribble valve is on alone is decreased, whereas if it is moved to the right as viewed in FIGURE 2, the amount of time when the dribble valve is on alone is increased. Normally, it is desirable to decrease the dribble time to minimum.

If, for some reason, overfilling of the container 47 should occur, an overbalance condition will exist on the scale and the scale beam will continue to move upwardly carrying with it the operating rod 63. The rod 63 carries the pin 112 which strikes the overbalance lever 81 as shown particularly in FIGURE 6 to remove the magnet 84 from the overload Mercoid 86 and to thereby open the circuit established by the Mercoid switch 86 as shown in FIGURE 6. This deenergizes the overload relay RY4. Deenergization of relay RY4 opens its contacts 3 and 4 to open the holding circuit for relay RY5. Deenergization of relay RY5 deenergizes relay RY2 and deenergization of relay RY2 deenergizes relay RY3 to shut off both the bulk and dribble valves. Closing of contacts 1 and 2 of relay RY4 energizes the overbalance lamp 116 to indicate that an overbalance condition has occurred. Thus, an overbalance condition will shut off both valves if they are still open.

Now let it be assumed that for some reason it is desirable to add a small quantity of fluid manually to the container 47. To accomplish this, the add push button 123 is operated to energize the winding of relay RY5. Energization of relay RY5 closes its contacts 1 and 2 which energizes the dribble relay RY2 to open the dribble valve in the manner as hereinbefore described. Relay RY5 remains energized only as long as the add push button 123 is held in a closed position. Normally, the add push button 123 is operated when the vane 115 is disposed between the lamp 96 and the photosensitive element 97. Therefore, the relay RY1 is not energized. However, in the event the add push button 123 is pushed when the vane 115 is not in this position, the latching circuit will be established for RY5. However, only the dribble valve will be opened and the container 47 will be filled very slowly. Filling will be terminated when the vane 115 interrupts the light passing to the photosensitive element.

A modification of the circuit shown in FIGURE 7 is shown in FIGURE 8. Most of the circuitry of FIGURE 8 has not been shown because it is identical to that of FIGURE 7. The major change is that a photosensitive diode is utilized instead of a photosensitive transistor. The circuit utilizes a diode 131 which is connected directly to the 115 volt A.C. supply. A filter capacitor 132 is provided for filtering the output. A voltage dropping resistor 133 is connected to the diode 131 and supplies voltage to one terminal of a photosensitive diode 134. The other terminal of the diode is connected to one side of the winding of relay RY1, and the other side of the winding relay RY1 is connected to the other side of the 115 volts A.C.

Operation of this embodiment of my invention is substantially identical to that hereinbefore described. When the vane permits light to shine on the photosensitive diode, photoconduction occurs to cause energization of the relay RY1. This circuit is advantageous over that shown in FIGURE 7 in that it eliminates the use of one transistor and also makes possible the use of a less expensive relay.

In the embodiment of my invention shown in FIGURE 7, transistor TR1 was a type T1800 and transistor TR2 was a type 2N35. In the embodiment of the invention shown in FIGURE 8, the photodiode 134 was a type CL–2 manufactured by Clarex.

By way of example, in the embodiment of the invention shown in FIGURES 1–7, I have found that it is possible to fill 50 gallon drums with the weight of approximately 500 pounds of oil within plus or minus ¼ of a pound.

It is apparent from the foregoing that I have provided a new and improved weighing apparatus. The apparatus if of such a type that it can be readily installed on any type of scale merely by securing the scale control apparatus to the beam of the scale. This makes it possible to utilize the device with either beam-type scales or dial-type scales. As is well known to those skilled in the art, dial-type scales also have beams to which my scale control device can be readily attached and operated in the same manner as when attached to a conventional beam-type scale. Low voltages have been utilized for the relays to minimize the possibility of sparking so that the apparatus can be utilized in hazardous or semi-hazardous locations without danger of causing an explosion. The apparatus is such that it is relatively inexpensive and still can perform weighing operations with great accuracy. It can be readily adjusted to obtain the desired accuracy. The apparatus is also of such a type that it requires very low maintenance.

I claim:

1. In a weighing apparatus, a scale having a balance beam, means for adjusting the scale so that the balance beam will assume a balanced position when the scale has received a predetermined weight of material, bulk and dribble control means providing bulk and dribble flow of material to be weighed by the scale, a light source, a photosensitive element adapted to receive light from said light source, an operating vane carried by said balance beam and adapted to control the passage of light from said light source to said photosensitive element, means for pre-loading said beam, and circuit means connecting said pre-loading means and said photosensitive element to said bulk and dribble control means, said circuit means including start means for starting operation of the weighing apparatus, said circuit means also including means operated by movement of the balance beam toward a balanced position for terminating bulk flow of material from said bulk and dribble control means, said circuit means also including means for terminating the dribble flow of material from said bulk and dribble control means when said vane affects the passage of light to said photosensitive element as the balance beam assumes a balanced position, said preloading means being out of engagement with said balance beam when the balanced position of the balance beam is being determined.

2. In a weighing apparatus, a scale for weighing material, the scale having a balance beam movable to a balanced position, means for counter-balancing said beam so that said beam reaches a balanced position when said scale has received a predetermined quantity of material, bulk and dribble control means providing bulk and dribble flow of material to be weighed by said scale, scale control means connecting said bulk and dribble control means to said scale to terminate the flow of material through said bulk and dribble control means when a predetermined quantity of material has been weighed by said scale, said scale control means including a light source, a photosensitive element adapted to receive light from said light source, a vane carried by said beam and adapted to control the passage of light from said light source to said photosensitive element, means for applying a predetermined pre-load to said balance beam to move the balance beam towards the balance position, circuit means connected to said bulk and dribble control means, said circuit means including switch means connected to said bulk and dribble control means, means for operating said switch means when said beam begins to move towards a balanced position, said switch means terminating bulk flow of material through the bulk and dribble control means, said circuit means also including means connected to said photosensitive element to terminate the dribble flow of material through said bulk and dribble control means when said vane affects the passage of light from said light source onto said photosensitive element.

3. A weighing apparatus as in claim 2 wherein said circuit means includes overbalance switch means adapted to be operated by said balance beam when said balance beam moves to an overbalance position.

4. A weighing apparatus as in claim 2 wherein said balance beam is free of frictional engagement with the pre-loading means when the balanced position of the balance beam is being determined.

5. In a weighing apparatus, a scale for weighing material, the scale having a balance beam movable to a balanced position when a predetermined quantity of material is weighed by the scale, bulk and dribble control means for controlling the flow of material to be weighed by said scale, a light source, a photosensitive element adapted to receive light from the said light source, a vane carried by said balance beam and adapted to control the passage of light from the light source to the photosensitive element, pre-load means applying a predetermined pre-load to the balance beam to urge the balance beam towards a balanced position, first switch means, and means operating the first switch means as the balance beam begins to move towards a balanced position, circuit means connecting said first switch means to said photosensitive element and to said bulk and dribble control means to control the flow of material through the same, said circuit being arranged so that as said first switch means is operated the substantial flow of material through said bulk and dribble control means is terminated and as the passage of light onto said photosensitive element is affected by said vane, the flow of material from said dribble control device is terminated.

6. A weighing apparatus as in claim 5 wherein said balance beam is free of friction from the pre-loading means when the balanced position of said balance beam is being determined.

7. A weighing apparatus as in claim 5 wherein said light source and said photosensitive element are carried by a single support member, and means for adjusting the position of the support member to thereby adjust the position of the photosensitive element and the light source with respect to the vane carried by the balance beam.

8. A weighing apparatus as in claim 5 together with second switch means, and means operated by movement of the balance beam to operate said second switch means when said balance beam moves to an overbalance position.

9. In a weighing apparatus, a scale for weighing material, a scale having a balance beam movable to a balanced position, means for counterbalancing said beam so that said beam reaches a balanced position when said scale has weighed a predetermined quantity of material, bulk and dribble control means providing bulk and dribble flow of material to be weighed by said scale, scale control means connecting said bulk and dribble control means to said scale to terminate the flow of material through said bulk and dribble control means when a predetermined quantity of material has been weighed by said scale, said scale control means including first switch means, means carried by said balance beam for operating said switch means when said balance beam is in a predetermined position, means for applying a predetermined pre-load to said balance beam to move said balance beam towards a balanced position, and circuit means connected to said bulk and dribble control means, said circuit means including second switch means connected to said bulk and dribble control means, means for operating said second switch means when said beam begins to move towards a balanced position, said second switch means terminating bulk flow of material through the bulk and dribble control means, said circuit means also including means connected to said first switch means to terminate the dribble flow of material through said bulk and dribble control means when said first switch means is operated by movement of said balanced beam.

10. A weighing apparatus as in claim 9 wherein the pre-loading means is out of engagement with the balance beam when the balance position of the balance beam is being determined.

References Cited in the file of this patent

UNITED STATES PATENTS

| | | |
|---|---|---|
| 924,940 | Rough | June 15, 1909 |
| 1,880,562 | Weckerly | Oct. 4, 1932 |
| 2,605,075 | Brown | July 29, 1952 |
| 3,001,597 | Stock | Sept. 26, 1961 |